United States Patent [19]

Graham, II

[11] Patent Number: 5,661,277

[45] Date of Patent: Aug. 26, 1997

[54] DIFFERENTIAL PRESSURE FLOW SENSOR USING MULTIPLE LAYERS OF FLEXIBLE MEMBRANES

[75] Inventor: James R. Graham, II, Tulsa, Okla.

[73] Assignee: Oklahoma Safety Equipment Co., Broken Arrow, Okla.

[21] Appl. No.: 566,312

[22] Filed: Dec. 1, 1995

[51] Int. Cl.$^6$ .................................................. H01H 35/34
[52] U.S. Cl. ......................... 200/81.9 R; 137/557; 200/61.08; 340/679
[58] Field of Search .................... 137/68.18, 554, 137/557; 116/266; 307/118; 73/709, 861.47, 861.52; 340/550, 590, 679, 611, 626; 200/81.9 R, 61.08, 834

[56] References Cited

U.S. PATENT DOCUMENTS

| Re. 34,308 | 7/1993 | Thompson | 340/679 |
|---|---|---|---|
| 1,641,196 | 9/1927 | Roucka . | |
| 2,408,685 | 10/1946 | Rosenberger | 73/407 |
| 2,561,700 | 7/1951 | Hughes . | |
| 3,296,868 | 1/1967 | Koppel et al. | 73/407 |
| 3,304,779 | 2/1967 | Reed | 73/205 |
| 3,770,918 | 11/1973 | Fortmann | 200/61.08 |
| 3,802,265 | 4/1974 | Wood | 73/211 |
| 3,963,043 | 6/1976 | Cota | 137/487.5 |
| 4,249,164 | 2/1981 | Tivy | 340/870.3 |
| 4,270,560 | 6/1981 | Kearney | 137/68 R |
| 4,342,988 | 8/1982 | Thompson et al. | 340/679 |
| 4,408,194 | 10/1983 | Thompson | 340/626 |
| 4,791,414 | 12/1988 | Griess | 340/606 |
| 4,951,697 | 8/1990 | Fritts | 137/68.1 |
| 4,978,947 | 12/1990 | Finnegan | 340/611 |
| 5,155,471 | 10/1992 | Ellis | 340/611 |
| 5,162,624 | 11/1992 | Duksa | 100/81.9 M |

FOREIGN PATENT DOCUMENTS 915540   1/1963   United Kingdom ............... 200/61.08

*Primary Examiner*—Gerald P. Tolin
*Attorney, Agent, or Firm*—Jones, Day, Reavis & Pogue

[57] ABSTRACT

A differential pressure flow sensor for use in a flow passageway of very low pressure flow lines and utilizing at least first and second conductive membranes in superimposed relationship having center portions constructed to create a discontinuity to allow a predetermined flow rate therethrough. A conductive strip is in juxtaposed relationship with the superimposed membranes and has a normally closed switch position. When the flow in the flow passageway exceeds the predetermined flow rate, the pressure against the flexible membranes opens the switch of the conductive strip and provides an electrical indication of the open switch.

38 Claims, 6 Drawing Sheets

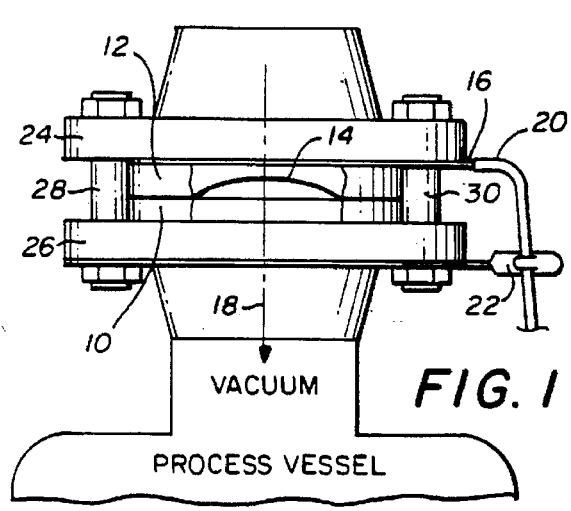
FIG. 1
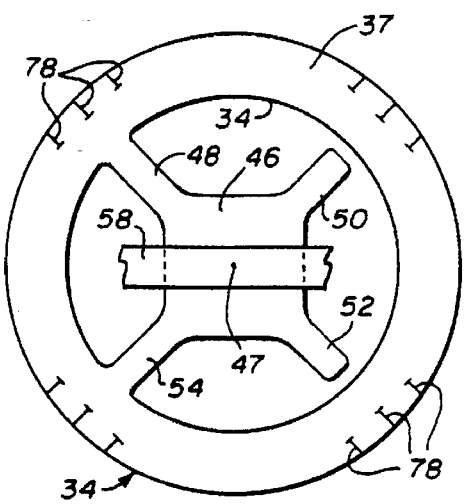
FIG. 3A
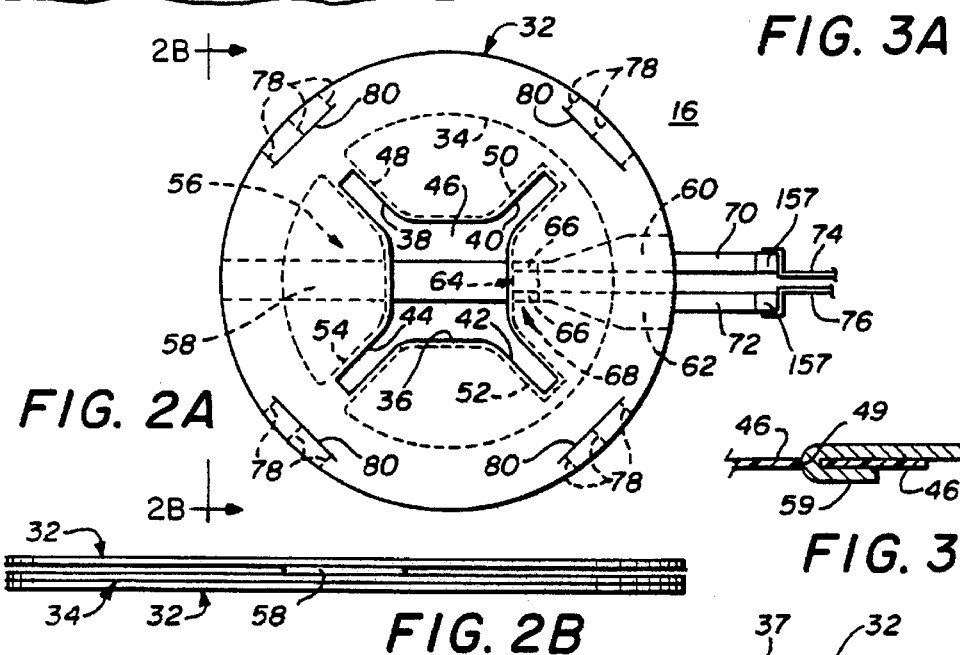
FIG. 2A
FIG. 2B
FIG. 3B
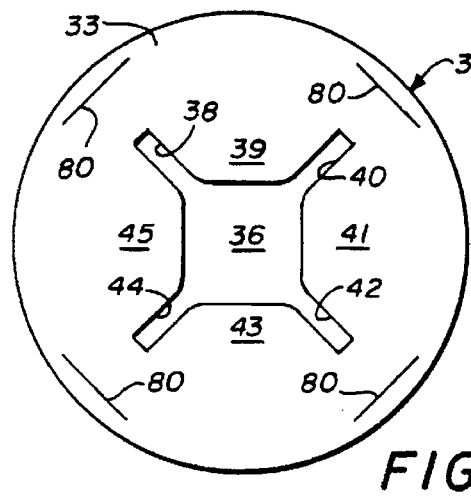
FIG. 4
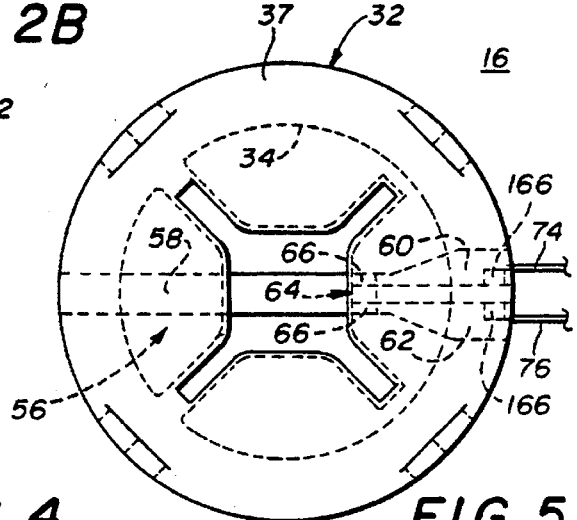
FIG. 5

DIFFERENTIAL PRESSURE FLOW SENSOR USING MULTIPLE LAYERS OF FLEXIBLE MEMBRANES

BACKGROUND OF THE INVENTION

1. Field of the Invention

The present invention relates generally to differential pressure flow sensors for use in very low pressure flow lines (with low flow rates) and that provide a signal when a differential pressure exceeds a predetermined mount and in particular relates to a differential pressure flow sensor utilizing multiple layers of flexible plastic membranes mounted on a support member across a central passageway in loosely fitting superimposed relationship with respect to each other to provide a discontinuity and allow a predetermined bleed flow rate therethrough. An electrically conductive strip of flexible material is placed in juxtaposed relationship with the multiple layers of flexible plastic membrane. The conductive strip has a normally closed switch portion completing an electrical circuit between first and second contacts and which is opened when the flow rate in the central flow passageway exceeds the allowable bleed flow rate capacity through the multiple plastic membranes thus providing an indication of an open conductive path.

2. Description of the Prior Art

As indicated in U.S. Pat. No. 5,155,471, there are many different types of prior art rupture disk monitoring devices and systems in which, when a disk ruptures, an electrical indication is given. However, as pointed out in the patent, it is a problem to obtain a reliable break limit as well as an indication of rupture disk failure in very low pressure flow situations.

In order to overcome that problem, U.S. Pat. No. 5,155,471 discloses a burst disk sensor employed in a relief flow line adjacent a low pressure rupturable disk which is damped normally upstream of the sensor across the flow line by means of inlet and outlet head members. The sensor has a basic frame or gasket member that can be damped between the inlet and outlet head members. The gasket carries a very thin membrane of plastic film thereon having the flow way portion slit to provide flexible petals. The petals are maintained closed across the flow way by means of one or more conductors bonded thereon and continuous thereacross, each of such conductors having a point of minimum break strength located centrally of the flow way cross section. The resistance of the membrane is thus eliminated from the break strength equation as only the conductor minimum breakpoint senses the fluid flow and consequent flow pressure presence, such as the result of an upstream rupture of a rupture disk. Electrical indication and/or alarm may then be actuated in response to the conductor breakage or open circuit.

Further, in U.S. Pat. No. Reissue 34,308, there is disclosed a flow sensor device in which a conductive loop is either secured to or passes in close proximity to a seal. If the seal is ruptured, it breaks the loop and thus provides a signal that the rupture has occurred.

Another known rupture disk monitor simply comprises a holder with a conductor extended across the flow passageway and contacting an electrical circuit to form a closed circuit. Upon rupture of the device, one end of the conductor is simply moved out of contact with another end thus breaking the circuit. The unit can be reset by simply reinserting the one end of the conductor into a conductive slot on the other end so as to re-establish the conductive path.

SUMMARY OF THE INVENTION

The present invention discloses an improved differential pressure flow sensor for use in very low pressure, low flow rate flow lines and includes at least first and second layers of flexible plastic membranes mounted on a support member and extending across the central flow passageway of the very low pressure line. The at least first and second layers of the flexible plastic membranes are in loose-fitting superimposed relationship with respect to each other to provide a membrane discontinuity and allow a predetermined bleed flow rate therethrough. An electrically conductive strip of flexible material is placed in juxtaposed relationship with the at least first and second layers of flexible plastic membrane. First and second electrical contacts are coupled to the conductive strip for providing an indication of a closed or open conductive path through the conductive strip. In order to accomplish this indication, the conductive strip has a normally closed switch portion completing an electrical circuit between the first and second contacts, the switch being opened when the flow rate in the line exceeds the bleed flow rate through the at least first and second plastic membranes with the very low pressure flow against the membranes opening the switch to provide an indication of an open conductive path.

Thus, it is an object to the present invention to provide a differential pressure flow sensor for sensing extremely low pressure differentials and flow rates in a flow line.

It is another object of the present invention to provide a differential pressure flow sensor that includes at least first and second layers of flexible plastic membranes interposed across a central flow passageway in loosely fitting superimposed relationship with respect to each other to provide a discontinuity at a predetermined bleed flow rate therethrough.

It is yet another object of the present invention to associate an electrically conductive strip of flexible material with the flexible plastic membranes, the conductive strips having closed electrical contacts such that when a pressure is applied to the flexible membranes that exceeds a predetermined differential, the contacts open on the conductive strip to provide an indication of an opened electrical circuit.

It is also an object to the present invention to provide a differential pressure flow sensor with an electrically conductive strip that has a normally closed switch portion completing an electrical circuit between first and second contacts with the switch being forced open when the flow rate in the flow line exceeds the bleed flow rate through the plastic membranes.

Thus, the present invention relates to a differential pressure flow sensor for use in a very low pressure, low flow rate, flow line and including an insulated support member sealed in the flow line and defining a central flow passageway, at least first and second layers of flexible plastic membranes mounted on the support member across the central flow passageway in loosely fitting superimposed relationship with respect to each other to provide a discontinuity at a predetermined bleed flow rate therethrough, an electrically conductive strip of flexible material in juxtaposed relationship with the first and second layers of flexible plastic membranes, first and second electrical contacts on the conductive strip for providing an indication of a closed or open conductive path through the conductive strip, and a normally closed switch forming a part of the conductive strip for completing an electrical circuit between the first and second contacts, the switch being opened when the flow rate in the flow line exceeds the predetermined bleed flow rate through the first and second plastic membranes, the flow pressure against the first and second plastic membranes opening the switch in the juxtaposed conductive strip to provide an indication of an open conductive path.

BRIEF DESCRIPTION OF THE DRAWINGS

These and other objects of the present invention will be more fully disclosed in the following DETAILED DESCRIPTION OF THE INVENTION in which like numerals represent like elements and in which:

FIG. 1 is a diagrammatic representation of the novel sensor of the present invention installed in the flow way of a low pressure flow line;

FIG. 2A is a plan view of the novel flow sensor of the present invention illustrating components thereof in phantom lines;

FIG. 2B is a diagrammatic representation of an enlarged edge view of the novel low pressure flow sensor;

FIG. 3A is a plan view of the inner membrane used in the low pressure flow sensor of FIG. 2A;

FIG. 3B is a partial cross-sectional view showing the attachment of one end of the conductive strip to one of the insulative membranes;

FIG. 4 is a plan view of the outside membranes used in conjunction with the inner membrane shown in FIG. 3 to form the device of FIG. 2A;

FIG. 5 is a plan view of an alternate embodiment of the present invention illustrating the electrical attachments to the conductive strip being located under the flange area of the membranes shown in FIG. 3 and FIG. 4;

DETAILED DESCRIPTION OF THE INVENTION

Figure 6:
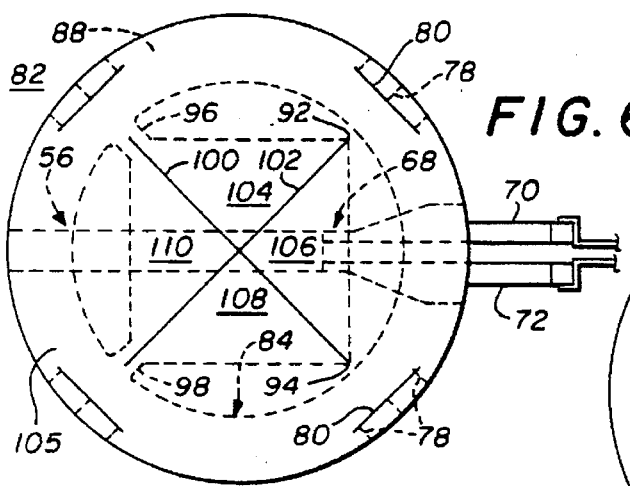
FIG. 6 is a plan view of another alternate embodiment of the present invention utilizing the inner membrane of FIG. 7A and the outer membranes as shown in FIG. 8.

FIG. 1 is a schematic representation of the installation of the novel flow sensor in a very low pressure flow line from a vessel side to an atmospheric side. The pressure differential across the sensor may be approximately 1.5 inches water column or 0.05 pounds per square inch. While not tested as of the present, it is believed that this design can be made to operate at even lower pressures. As can be seen in FIG. 1, an inlet holder 10 and an outlet holder 12 engage and hold in position a rupture disk 14 and sensor 16 in the flow path 18 of the flow line. An electrical cable 20 is connected to a conductive strip associated with the sensor 16 and operating as will be disclosed hereafter to provide an indication if the conductive strip has an open circuit. A cable support 22 holds the electrical cable 20 in position. When vacuum occurs in the vessel creating a pressure differential (such as when the vessel is being emptied) along path 18 which ruptures disk 14, the ensuing flow along path 18 opens the conductive strip in sensor 16 as will be shown hereafter to cause an indication on electrical cable 20 that a rupture has occurred. Flanges 24 and 26, which maintain the elements in a cohesive unit, are held together by bolts 28 and 30.

A first embodiment of the sensor 16 of the present invention is illustrated in FIG. 2A with a schematic side view illustrated in FIG. 2B. It is formed of two outer layers 32 of flexible insulative membrane which may be a flexible plastic such as tetrafluoroethylene and co-polymers such as are marketed under the trademark "TEFLON". The preferred thickness is approximately 0.005 inches. A third inner layer of insulative membrane 34 is between the first and second outer layers 32 of membrane. The inner membrane 34 is also flexible and has a thickness of approximately 0.005 inch. It is made of the same material as the outer membranes or can be made of metal as will be shown hereafter. A conductive strip 56 is interposed between one of the outer membrane layers 32 and the inner membrane layer 34 and may be adhesively attached to a portion of the inner layer 34 as will be described hereafter in relation to FIG. 3A. FIG. 3A is a plan view of the inner membrane 34 and FIG. 4 is a plan view of one of the two outer membranes 32. Each of the first and second outer flexible membrane layers 32, as shown in FIG. 4, includes a substantially square opening 36 with slots 38, 40, 42, and 44 extending radially outwardly from the four corners thereof. The slots 38, 40, 42, and 44 form flexible flap or petal portions 39, 41, 43, and 45 therebetween. Thus the opening 36 and slots 38–44 form a discontinuity in the membrane layers 32 that has a periphery creating at least two adjacent flexible petal portions 39, 41, 43, and 45 separated by the discontinuity (slots 38–44). The area beyond the outer ends of the slots 38, 40, 42, and 44 forms a flange area 33 for mounting in a support member.

The inner membrane layer 34, shown in FIG. 3A, has an outer annular flange portion 37 to which is attached a square flexible flap 46 having arms 48, 50, 52, and 54 extending radially outwardly from a respective one of each of the four corners of the flexible flap 46. Two of the arms 48 and 54 extend outwardly to and are integrally formed with the flange portion 37 of the inner membrane 34. When the two outer membranes 32 and the inner membrane 34 are mounted in superimposed relationship as illustrated in FIG. 2B, the square flexible flap portion 46 substantially covers the square opening 36 in the outer membranes 32 as illustrated by the phantom lines in FIG. 2A. Because these outer membrane layers 32 and inner membrane layer 34 are in loosely fitting superimposed relationship with respect to each other, they provided discontinuity and allow a predetermined bleed flow rate therethrough. The bleed flow rate can be varied or controlled by changing the geometry of the square flexible flap 46 and its arms 48, 50, 52, and 54 with respect to the square opening 36 in the outer membranes 32 and its respective slots 38, 40, 42, and 44. In other words, the arms 48, 50, 52, and 54, which are superimposed over slots 38, 40, 42, and 44 can be made wider or narrower in the relation to the slots thus allowing more or less of a bleed flow rate therethrough. In addition, of course, orifices could be formed in the square flexible flap 46 or its arms 48, 50, 52, and 54 and/or in the flexible flaps or petals 39, 41, 43, and 45 in one or both of the outer membranes 32.

As can be seen generally in FIG. 2A, a conductive strip 56 is interposed between one of the outer membrane layers 32 and the inner membrane layer 34. It has a first portion 58 and second portions 60 and 62. The end 64 of first portion 58 is formed as a female contact while inner ends 66 of the second portions 60 and 62 form male contacts that are inserted in the female contact 64 to form a normally closed switch 68. This will be shown in more detail hereafter in relation to FIGS. 12–16. If desired, the first portion 58 of the electrical conduit may be adhesively attached to the square flap 46 within the crosshatched area 47 shown in FIG. 3A. Alternatively, the left end of first portion 58 of conductive strip 56 shown in FIG. 2A may terminate at any position on the square flap 46 and attached thereto as shown in FIG. 3B. The attachment may be made in any well-known manner but may use slots in the square flap 46 similar to those shown in FIG. 17. By inserting one end of first portion 58 through such slot and bending the end in a "U" and crimping it as shown by tab 159 in FIG. 15, it will provide sufficient attachment strength.

FIG. 3B illustrates the outer end 59 of conductive strip portion 58 being attached to the inner insulative membrane 46 (or the outer nonconductive membrane 32). A slot is formed in the appropriate membrane and the outer end 59 of the conductive strip portion 58 is inserted therein and folded backward as shown and crimped. A sufficient attachment is formed in this way.

In operation, if the disk 14 in FIG. 1 ruptures, and the pressure, which may be a very low pressure in the order of 0.05 pounds per square inch differential, causes flow which exceeds the bleed flow rate through the two outer membranes 32 in FIG. 2B and the inner membrane 34, the pressure against flexible square flap 46 moves first portion 58 of the conductive strip 56 and separates the female contact 64 from the male contacts 66 thus causing an open circuit. The conductor extensions 70 and 72 shown in FIG. 2A, which are integrally formed with the conductive strip portions 60 and 62, have wires 74 and 76 attached thereto for providing an indication of the opening of switch 68. In the normally closed condition, a signal on line 74 will pass through extension 70, second portion 60 of the conductive strip, the male end 66, and female portion 64 to the other male portion 66 of the second portion 62 of the conductive strip, through extension 72 and wire 76 thus completing the circuit. When the pressure is applied to the flexible square flap 46 in the inner membrane 34, the pressure pulls the female contact 64 from the two male contacts 66 thus opening the circuit and giving an indication on lines 74 and 76 that a rupture has occurred.

The radial marks 78 in substantially radial alignment with each of the arms 48, 50, 52, and 54 of the inner membrane 34 can be aligned with the marks 80 in the outer periphery of the flange portion 33 of the two outer flexible membranes 32 so that the assembly can be mounted properly. The relationship of the marks 78 and 80 when assembled is illustrated in FIG. 2A. Thus, in FIG. 2A, the three membranes 32, 34, and 32 are in laminated form with respect to each other as illustrated in the exaggerated view of FIG. 2B.

The alternate version illustrated in FIG. 5 is identical to FIG. 2A except that the connection of wires 74 and 76 to the first and second arms 60 and 62 of the second portion of the electrical conductive strip is under the flange area 34 as shown. The manner in which the two arms 60 and 62 are constructed for use in FIG. 5 is shown in FIG. 16 and will be discussed hereafter.

Figure 7A:
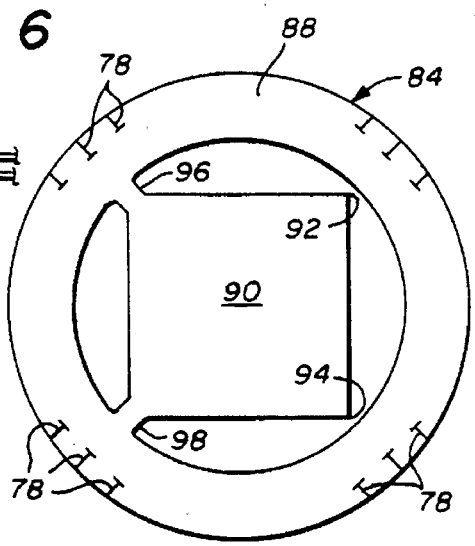
FIG. 7B is plan view of an alternate inner membrane.
FIG. 7D is an edge view of another embodiment of the present invention.
FIG. 7E is a plan view of another embodiment of the present invention utilizing a metal inner membrane as shown in FIG. 7C with the outer membrane shown in FIG. 8 to obtain a device having an edge view shown in FIG. 7D.
Figure 8:
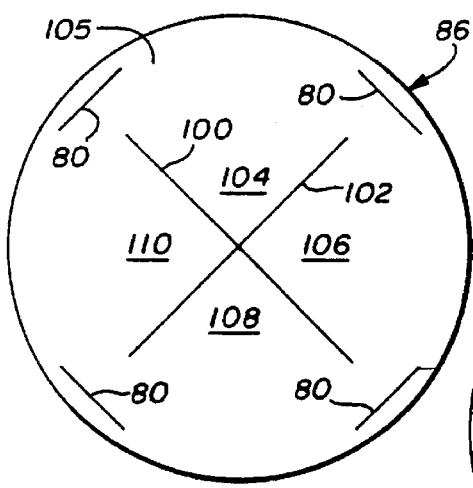

A second embodiment of the novel sensor is illustrated in FIGS. 6, 7A, and 8. FIG. 6 is the plan view of the composite sensor formed of an inner membrane 84, illustrated in FIG. 7A, between two outer membranes 86, one of which is illustrated in FIG. 8. in FIG. 8, an opening or discontinuity in membrane 86 is formed by first and second perpendicular slits 100 and 102 extending outwardly toward the flange portion 105 that circumscribes the outer ends of the slits 100 and 102. Thus, the outer membranes 86 allow a predetermined bleed flow rate through the slits 100 and 102. However, as shown in FIG. 7A, the inner membrane 84 has a center portion including a flexible square portion 90 with corners such as 92 and 94 extending toward a flange portion 88 and being of a size sufficient to substantially cover the perpendicular slits 100 and 102 in the first and second membranes 86. Arms 96 and 98 extend radially outwardly from two of the corners of the square 90 toward and being integrally formed with the flange portion 88 of the center membrane 84. The unit, when assembled, is illustrated in FIG. 6. Again, a flexible conductive strip 56 is interposed between one of the outer membranes 86 and the inner membrane 84 in juxtaposed relationship. Again, it may be adhesively attached to the flexible square portion 90 in FIG. 7A in a manner similar to that disclosed in relation to FIG. 3A. Again, when the bleed flow rate through slits 100 and 102 and around square flap 90 is exceeded by the flow rate in the flow line, the flow pressure against the membranes causes the switch 68 to open as previously discussed and an indication of the rupture given.

Figure 7B:
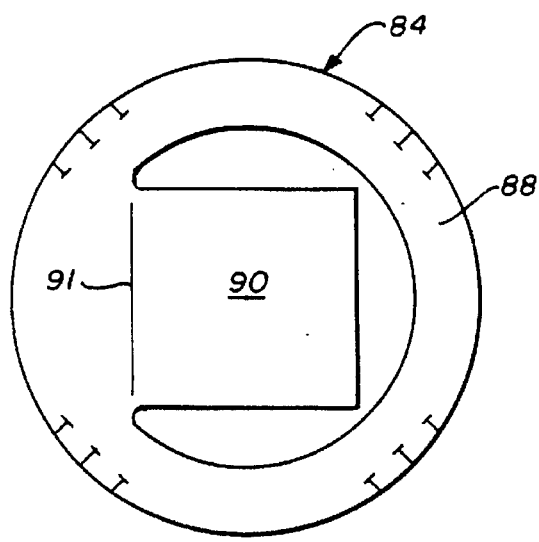

The center membrane in FIG. 7A may be formed as shown in FIG. 7B. It is continuously attached to flange portion 88 along one edge. A slot or slit 91 may be added therein as necessary for flexibility.

Figure 7C:
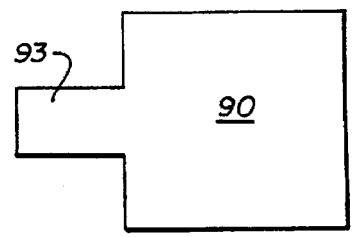
Figure 7D:
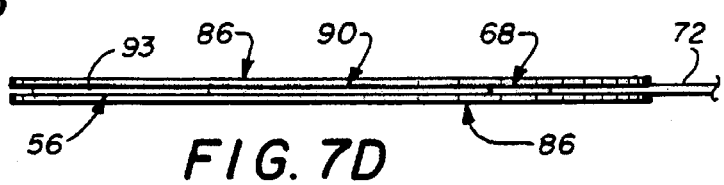
Figure 7E:
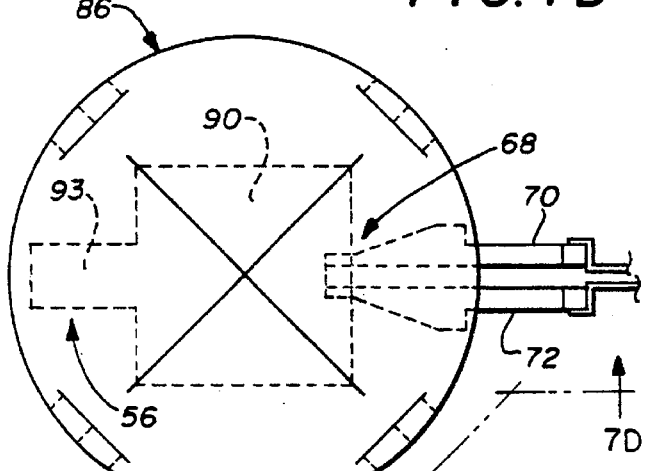

As can be seen in FIG. 7C, the inner membrane 90 may be formed of metal thus obviating the need for flexible metallic strip portion 58. Conductive strips 70 and 72 make electrical contact with inner metallic membrane 90 to form operable switch 68. The edge view is shown in FIG. 7D.

Figure 9:
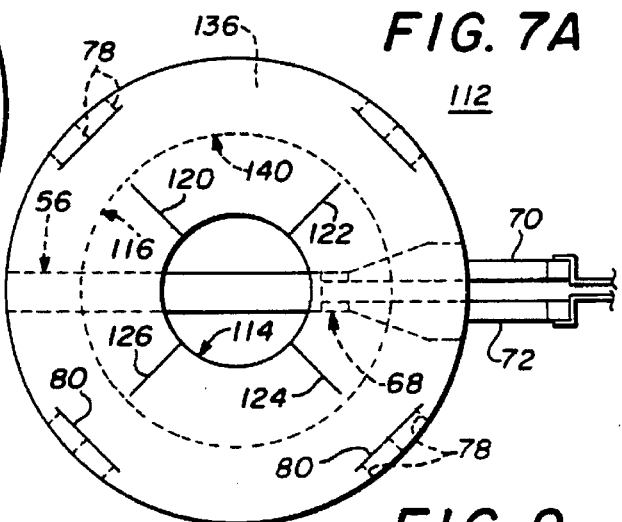
FIG. 9 is a plan view of still another embodiment of the present invention utilizing the inner membrane illustrated in FIG. 10A and the outer membranes as illustrated in FIG. 11.
Figure 10A:
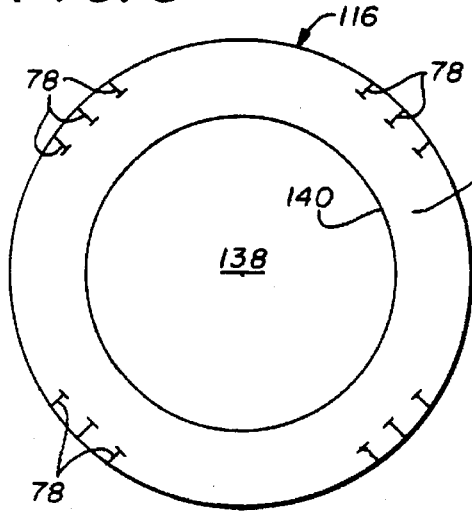
FIG. 10C is a plan view of still another embodiment of the present invention using the inner metal membrane illustrated in FIG. 10B and the outer membrane illustrated in FIG. 11.
Figure 11:
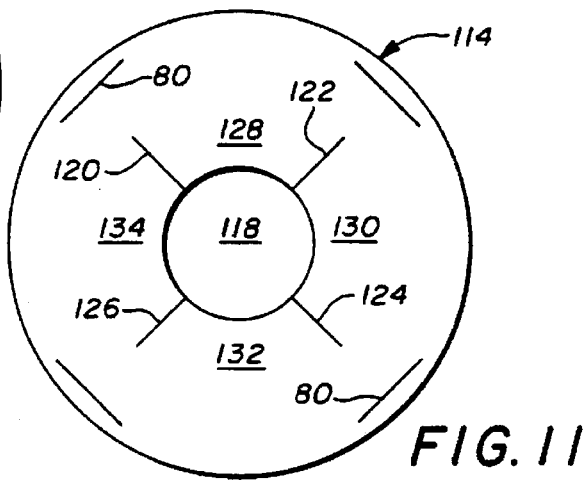

A third embodiment of the novel flow pressure sensor is illustrated in FIGS. 9, 10A, and 11, wherein FIG. 9 is a plan view of the composite sensor 112 comprised of outer membranes 114 illustrated in FIG. 11 separated by an inner membrane 116 as illustrated in FIG. 10A. Thus, a discontinuity or opening in the outer membranes 114 includes a center orifice 118 having a first diameter and four slits 120, 122, 124, and 126 that are equally spaced from each other and extend radially outwardly from the center orifice 118 to form four flaps or petals 128, 130, 132, and 134. The inner membrane 116 illustrated in FIG. 10A has a center orifice 138 having a second diameter larger than the diameter of orifice 118 in the outer membranes 114. Inner membrane 116 is in the form of an annular flange having an inner circumference 140 that circumscribes the outer ends of the slits 120, 122, 124, and 126 in the outer membranes 114 as illustrated in FIG. 9. By adjusting the ratio of the diameter of orifice 118 in outer membranes 114 in relation to the diameter of orifice 138 in inner membrane 116, the differential pressure at which the switch 68 opens can be adjusted. As in the embodiments in FIGS. 2A and 6, the electrical extensions 70 and 72 extend outwardly beyond the flange portion 136 for receiving a connection to electrical leads. The marks 142 and 144 illustrated in the inner membrane 116 in FIG. 10A are for alignment purposes and are aligned with slits 120 and 126 in the radial direction as illustrated in FIG. 9.

Figure 10B:
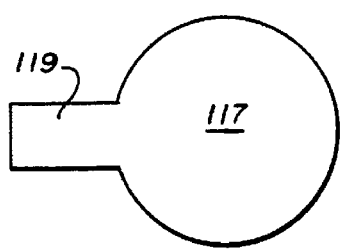
Figure 10C:
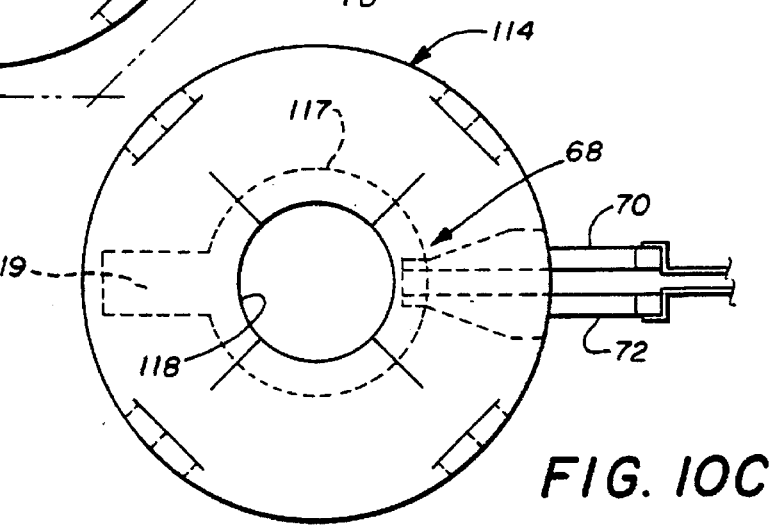

The inner membrane 116 in FIG. 10A can be replaced by the metal inner membrane 117 shown in FIG. 10B. As can be seen, metal membrane 117 is substantially circular in shape but could be made in other shapes such as octagonal and may have a diameter larger or less than center orifice 118 in outer membrane 114. It has a projection 119 which may be used to attach it firmly between the two outer membranes 114 such as by glue or by insertion between pipe flanges as shown in FIG. 10C.

Figure 12A:
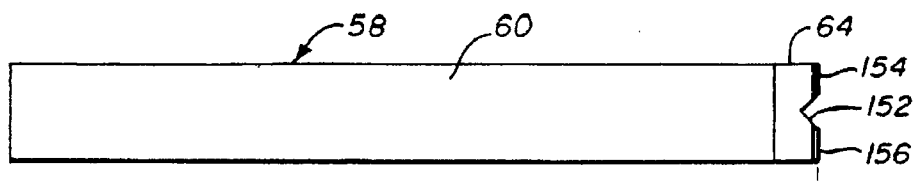
FIGS. 12A and 12B substrate a first portion of a conductive strip having one end folded along the phantom line shown in 12B to form a female contact for one end of the conductive strip as shown in enlarged view in FIG. 13.
Figure 12B:
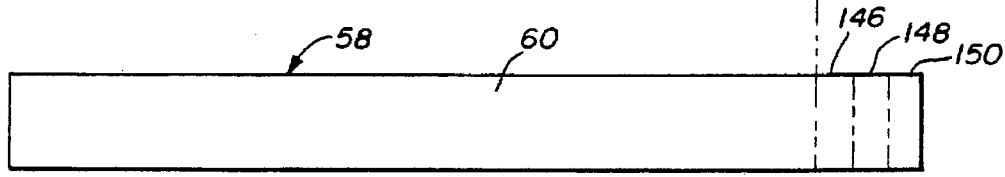
Figure 13:
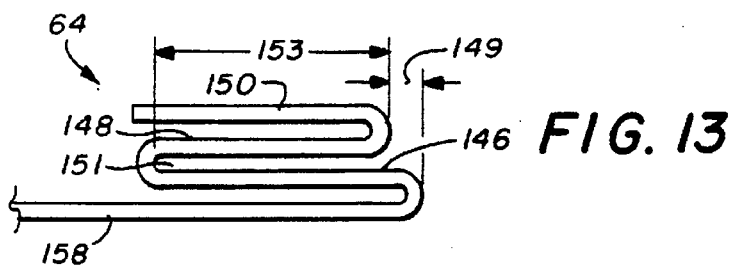
Figure 14A:
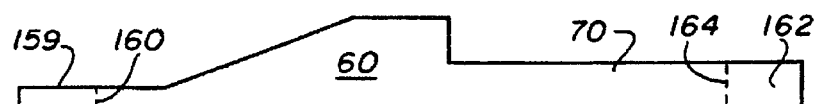
FIGS. 14A and 14B illustrate the male portion of the electrical contact illustrating how the outer ends are folded to form contact surfaces and illustrating in FIG. 14B, the manner in which the male and female portion (in phantom lines) connect to form an electrical contact.
Figure 14B:
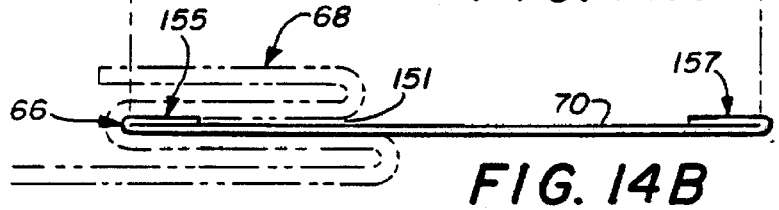

A first portion 58 of the conductive strip 56 is illustrated in FIG. 12A and FIG. 12B. FIG. 12A illustrates the first portion 58 in its completed state and has a body portion 60 with one end having a female connection 64 as illustrated in FIG. 2A. As can be seen in FIG. 12B, one end of the first portion 58 of the conductive strip has three portions 146, 148, and 150 which are folded over each other to form a U-shaped opening projecting inwardly from first portion 58. This can be seen more clearly in FIG. 13 where the panels 146, 148, and 150 are shown folded over each other to form a U-shaped slot 151 in which the male end 66 of the second portion 60 of the conductive strip 56 can be inserted as shown in FIG. 14B. It will be noted in FIG. 13 that the fold portion 150 is extended over fold portion 148 so that the combination is spaced inwardly a distance indicated by arrow 149 from the outer end of the fold 146 over second portion 58. This allows easy insertion of the male portion 66 of the second portion 60 of conductive strip 56 to be inserted therein as illustrated in FIG. 14B. The depth of the U-shaped slot 151 is indicated by the arrow 153 in FIG. 13 and is actually very shallow but is sufficient to allow some slidable movement of the male portion 66 with respect to the slot 151 so that some bending of the conductive strip can occur without the switch 68 opening.

Figure 15:
FIG. 15 is a plan view of the male portion of the electrical contact illustrating a wire attached to one end thereof for providing the indication of the open circuit.

Thus, as can be seen in FIG. 14B, switch 68 comprises the female portion 64 having the slot 151 into which is inserted the male portion 66 of the second portion of the conductive strip in a slidable relationship. Thus, the first portion 58 and second portion 60 are detachably connected to each other to form a normally closed switch such that, when a predetermined pressure is applied to the membranes, the first and second strip portions 58 and 60 detach and electrical continuity through the conductive strip 56 is broken. Again, the first detachable portion 58 has an outer end extending from the flange portions 33 in FIG. 4 and 37 in FIG. 3A inwardly and having an inner end 64 as shown in FIGS. 1A and 12A. The inner end 64 is folded so as to form a U-shaped opening 151 that projects inwardly as shown in FIG. 13. The second detachable portion 60 is formed of first and second individual arms 60 and 62 as shown in FIG. 2A. Each arm 60 and 62 has a first end 155 forming the male portion 66 as shown in FIG. 14B for slidable longitudinal engagement with the U-shaped opening 151 of the first detachable portion 58 to make electrical contact and a second end 70 extending outwardly beyond said flange for providing the electrical extension such that when the first and second strip portions 58 and 60 are slidably detached, the circuit is broken and an indication is provided. As can be seen in FIG. 12A a V-shaped notch 152 is cut in end 64 of body portion 60 to form two separated female contacts 154 and 156. As can be seen in FIG. 2A, the male end 66 of each of the arms 60 and 62 mate with the respective one of the female contacts 154 and 156. As can be seen in FIG. 14A, the inner end 159 of conductive arm 60 is folded about fold line 160 over body portion 60 to form the male connection 66 shown in FIG. 14B and FIG. 15. In like manner, the other outer end 162 of arm 60 is folded over arm 60 about fold line 164 to form the outer connection 157 in FIG. 14B for connection to a wire 74 as shown in FIG. 15.

Clearly, the U-shaped end 158 in FIG. 13 could be the male end and the male end 155 in FIG. 14B could be the U-shaped end. Thus, FIGS. 12A, 12B, 13, 14A, and 14B are not intended to be limiting.

Figure 16A:
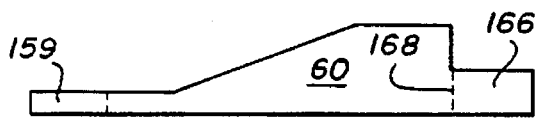
FIGS. 16A and 16B illustrate another version of the male portion of the electrical contact in which the wire attachment can be made under the flange area of the sensor as illustrated in FIG. 5.
Figure 16B:
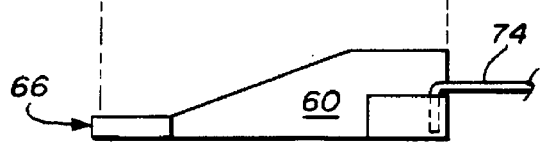

The other version illustrated in FIG. 5 has the arms 60 and 62 terminating in a connection under flange portion 37 in FIG. 5. FIG. 16 illustrates such construction wherein the outer end 166 of arm 60 is folded about fold line 168 over the body of the arm 60 as shown in FIG. 16B for attachment to the wire 74. The other end 159 in FIG. 16A is folded about fold line 160 as illustrated in FIG. 16B to form the male end 66.

Figure 17:
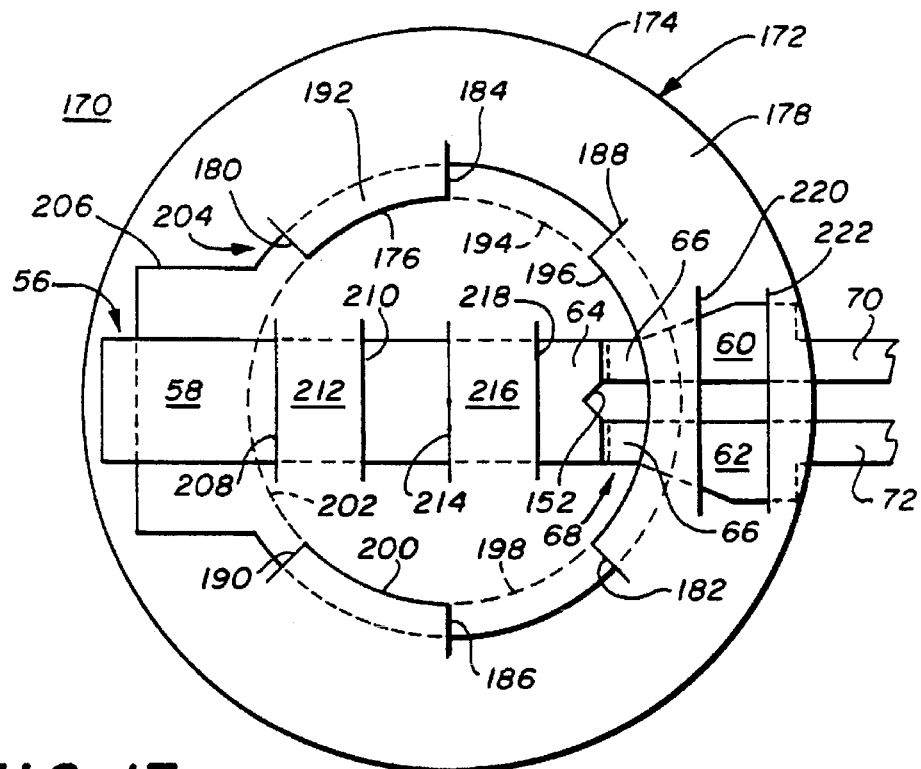
FIG. 17 is a plan view of still another embodiment of the present invention which utilizes two membranes in interwoven or meshed relationship with each other.

Another embodiment 170 of the novel sensor is illustrated in FIG. 17 wherein first and second woven membranes are mounted on the support member across a central flow passageway in loosely fitting superimposed relationship with respect to each other to provide a discontinuity and allow a predetermined bleed flow rate therethrough. As can be seen in FIG. 17, a first washer-shaped flexible plastic membrane 172 has an outer circumference 174 and an inner circumference 176 and has a flange portion 178 adjacent said outer circumference 174 for mounting on said support members shown in FIGS. 19, 20, and 21. A plurality of sets of opposing slits 180, 182 and 184, 186 and 184, 190 extend inwardly into said first membrane 172 from the inner circumference 176 to form an even number of flaps or petals 192, 194, 196, 198, 200, and 202. A second flexible plastic membrane 204 is substantially circular in shape and has a diameter sufficient to be interwoven over each alternate flap or petal 194, 198, and 202 of the first membrane 172 and under the remaining alternate flaps or petals 192, 196, and 200 so as to substantially interlock the first and second membranes together. A projection 206 extends outwardly from the second circular membrane 204 into the flange portion 178 of the first flexible plastic membrane 172 for mounting on the support member.

The conductive strip 56 is again in juxtaposed relationship with the two membranes 172 and 204. The first portion 58 of conductive strip 56 may be interwoven with the two membranes 172 and 204. It passes through slit 208 in membrane 204, under portion 212 thereof, and exits slit 210 on the top of the membrane 204. It then goes in slit 214 under portion 216 of membrane 204 and then exits slit 218 where contact switch 68 is formed. Arms 60 and 62 of the second portion of the conductive strip 56 then go on top of the membrane 204 and under the flap 196 of the other membrane 172. They exit slit 220 and are on top of flange portion 178 of the other membrane 172. They then enter slit 222 and are under the remaining flange portion of the other membrane 172 where they exit as extensions 70 and 72 for use as explained earlier. Because these membranes are extremely thin, 0.005 inches, they flex with respect to each other and allow a predetermined bleed flow rate therethrough. Of course the bleed flow rate can be adjusted by varying the inner diameter of the washer-shaped first membrane 172 and the depth of the slit sets such as 180, 182 and the like.

Figure 18:
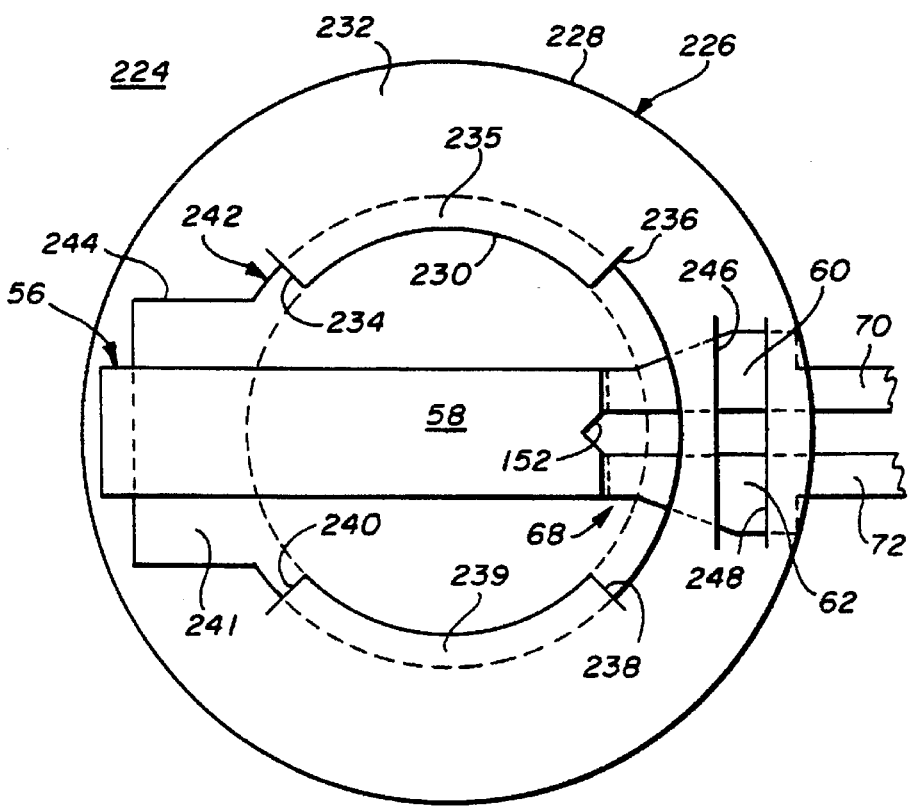
FIG. 18 is a plan view of still another embodiment of the present invention, again utilizing two membranes in meshed relationship with each other.

Another version of the novel sensor 224 is illustrated in FIG. 18 in which, again, a first annular or washer-shaped membrane 226 has an outer circumference 228 and an inner circumference 230 and includes a flange portion 232 adjacent the outer circumference 228 for mounting on a support member. At least four slits 234, 236, 238, and 240 are equally spaced 90° from each other and extend inwardly into the first membrane 226 from the inner circumference 230 to form four petals or flaps 235, 237, 239, and 241. A second membrane 242 is substantially circular in shape as shown and has a diameter sufficient to be interwoven over two opposing flaps or petals 237 and 241 and under the remaining two opposing flaps 235 and 239 on the first membrane 226. A tab, extension, or projection 244 is formed on the second membrane 242 and extends outwardly toward the outer circumference 228 of the first membrane 226 so that it can be contained by the support member.

Again, the flexible electrically conductive strip 56 has one end 58 that extends essentially entirely across the second membrane 242. Again, it joins second portions 60 and 62 at switch portion 68 as described earlier. Second conductive strip portions 60 and 62 enter slit 246 in the flange portion 232 of the first membrane 226 and exit slit 248 thus crossing over the top of the flange portion 232 between the two slits 246 and 248 and otherwise passing under it. The electrical extensions 70 and 72 protrude beyond the first washer-shaped membrane 226 as shown.

Figure 19:
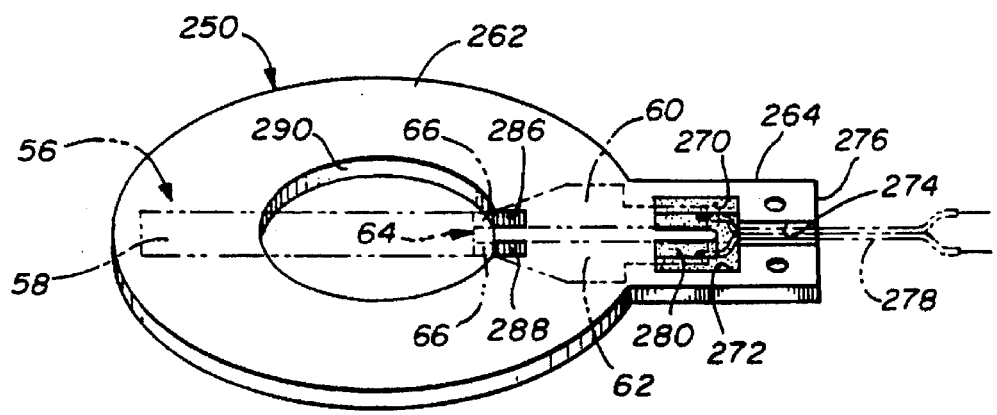
FIG. 19 is a plan view of an inner portion of a support member for the novel sensor illustrating cavities in which portions of the male contacts of the sensor conductive strip are placed and attached to external wires and then the cavities filled with material such as epoxy.
Figure 20:
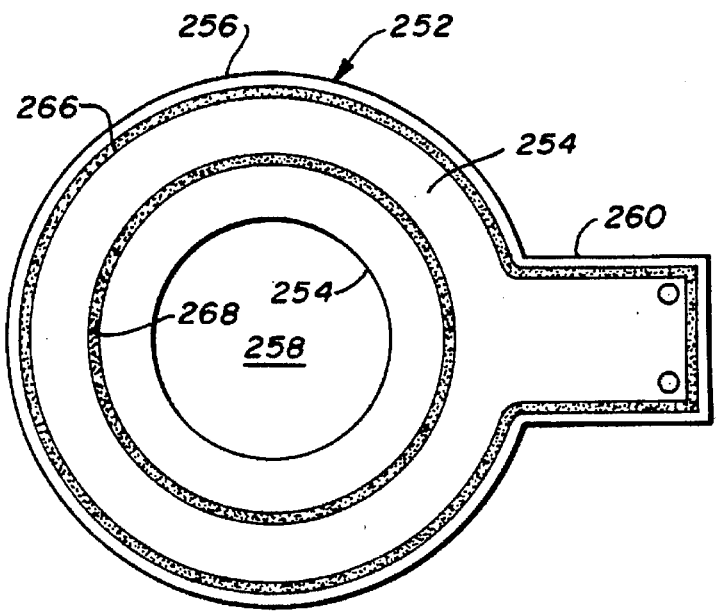
FIG. 20 illustrates the outer portions of the support member that are glued to each side of the center portion shown in FIG. 19 to form a composite support member as illustrated in FIG. 21.
Figure 21:
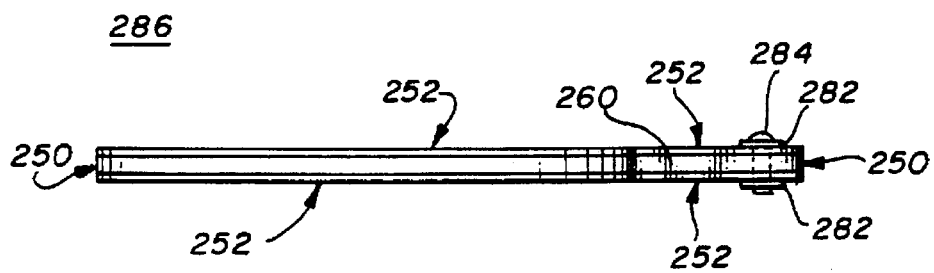

FIGS. 19, 20, and 21 disclose an insulated support member for holding the pressure flow sensor in the flow channel of a very low pressure flow line. The differential pressure flow sensors illustrated in FIG. 2A, FIG. 6, FIG. 9, FIG. 17, and FIG. 18 could all be used with the insulated support member illustrated in FIGS. 19, 20, and 21. FIG. 21 is a side view of the insulated support member that has first and second outer layers 252 of substantially rigid insulating material in superimposed relationship. Each outer layer is in the form of an annular flange 254 shown in FIG. 20 and having an inner and outer circumference 254 and 256, respectively. The inner circumference 254 forms a center opening 258 defining the central flow passageway. A projection 260 on each outer layer extends outwardly from the outer circumference 256 of the annular flange 252. A third center layer 250 of substantially rigid insulating material is shown in FIG. 19. It is in the form of an annular flange 262 and is in superimposed relationship with the first and second outer layers 252. As can be seen in FIG. 21, the thickness of the third center layer 250 is greater than the thickness of the first and second outer layers 252. A projection 264 on the third center layer 250 as shown in FIG. 19 is in superimposed mating relationship with each of the outer layer projections 260. The layers of flexible plastic membrane as discussed earlier in relation to FIGS. 2A, FIG. 6, FIG. 9, FIG. 17, and FIG. 18 with the juxtaposed conductive strip 58 are mounted between the flange 262 of the inner layer 250 and one of the flanges 254 of the first and second outer layers 252. The outwardly extending second end of the first and second arms 60 and 62 of the conductive strip are mounted between the third center layer 250 and one of the first and second outer layers 252. Glue strips 266 and 268 on each of the first and second outer layers 252 attach them to the third inner layer 250 in superimposed relationship in a sandwich fashion.

As can be seen in FIG. 19, first and second adjacent cavities 270 and 272 in the third center layer 250 extended projection or portion 264 receive the outer ends of the respective first and second arms 60 and 62 of the conductive strip. A third cavity 274 extends inwardly from the outer edge 276 of the extension 264 and intersects both the first and second adjacent cavities 270 and 272 to form a passageway. Externally accessible electrical conductors 278 are placed in the passageway and attached to the second ends of the first and second arms 60 and 62 for providing the indication of an open switch. An epoxy, illustrated by the crosshatched lines 280, is placed in the cavities to seal the electrical conductors and the second ends of the first and second arms 60 and 62 of the conductive strip 56. As shown in FIG. 21, a plate 282 is placed on each outer side of the extended projections 260 of the first and second outer layers 252 and at least one rivet 284 extends from one metal plate 282 on one side of the extended projection 260 to the other side of the other extended projection 260 of the outer layers 252. Thus in this manner, the outer ends of both the first portion 58 of the conductive switch 56 and the first and second arms 60 and 62 forming the second portion are securely held by the insulated support member shown as an integral unit 286 in FIG. 21. Adjacent recesses 286 and 288 extend inwardly from the inner circumference 290 of center layer 250 in axial alignment with the adjacent cavities 270 and 272 and receive the inner ends 66 of the first and second arms 60 and 62 of the conductive strip 56. They may be sealed with epoxy in a like manner as discussed previously.

Thus there has been disclosed a novel low pressure flow sensor that does not require knife blades or tearing of material to operate them. The invention operates at very small flow rates and differential pressures. Further, bleed rates through the sensor can be controlled by changing sensor geometry (the shape of the adjacent membranes) or punching holes in the adjacent membranes.

The invention consists of a multilayered laminated membrane assembly or a multilayered woven membrane assembly. Ideally, the layers are flexible, high temperature plastic such as the product marketed under the trade name "TEFLON". A conducting strip of thin metal is used as a continuity-type, normally closed switch. The geometry of the membrane layers is such that most of the flow is blocked prior to actuation. The flexible membrane layers permit actuation at very low flows and differential pressures and also bend easily out of the flow path to provide large flow coefficients.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A differential pressure flow sensor for use in a very low pressure flow line having a central flow passageway and including:

at least first and second layers of flexible membranes mounted across said central flow passageway in loosely fitting superimposed contacting relationship with respect to each other, at least one of said membranes having a discontinuity with a predetermined fluid bleed flow rate through said membranes;

an electrically conductive strip of flexible material in juxtaposed relationship with the first and second layers of flexible membrane and having a first portion and a second portion; and first and second openable electrical contacts on the conductive strip portions forming a normally closed switch for completing an electrical circuit between the first and second contacts, and providing an indication of a closed or open conductive path through the conductive strip, said switch contacts being opened to separate said first and second portions when the flow rate in the line exceeds the allowable fluid bleed flow rate capacity through the at least first and second membranes, the flow pressure against the first and second membranes opening the switch contacts in the juxtaposed conductive strip portions to provide an indication of an open conductive path.

2. A flow pressure sensor as in claim 1 wherein the at least first and second membranes are in laminated form with respect to each other.

3. A flow pressure sensor as in claim 1 wherein said at least first and second flexible membranes are in woven form with respect to each other.

4. A flow pressure sensor as in claim 2 wherein said at least the first and second laminated membranes include:

first and second outer layers of insulative membrane in superimposed relationship, each outer membrane layer having a flange portion and a first center portion with an opening; and each opening forming a discontinuity in the membrane and having a periphery creating at least two adjacent flexible petal portions separated by said discontinuity.

5. A flow pressure sensor as in claim 4 further including:

a third inner layer of insulative membrane between the first and second outer membrane layers, said third layer having a flange portion and a center portion having substantially the shape of and overlapping said opening in said first and second outer membrane layers; and said conductive strip being interposed between one of said first and second outer layers and said third inner layer.

6. A flow pressure sensor as in claim 4 wherein said electrically conductive strip has one portion at least parts of which have a diameter greater than said opening on said center portion of said first and second outer insulative membrane layers.

7. A flow pressure sensor as in claim 6 wherein said conductive strip center portion is circular.

8. A flow pressure sensor as in claim 6 wherein said conductive strip center portion is square.

9. A flow pressure sensor as in claim 3 wherein said woven membranes include:

a first washer-shaped membrane having an outer circumference and an inner circumference and including a flange portion adjacent said outer circumference for mounting on said support member;

at least four slits in said first membrane equally spaced 90° from each other and extending inwardly from said inner circumference to form four petals; and a second membrane being substantially circular in shape and having a diameter sufficient to be interwoven over two opposing petals on said first membrane and under the remaining two opposing petals on said first membrane to substantially interlock said first and second membranes together.

10. A flow pressure sensor as in claim 3 wherein said first and second woven membranes include:

a first washer-shaped flexible membrane having an outer circumference and an inner circumference and having a flange portion including said outer circumference for mounting on said support member;

a plurality of sets of opposing slits in said first membrane extending inwardly from said inner circumference to form an even number of petals;

a second flexible membrane being substantially circular in shape and having a diameter sufficient to be interwoven over each alternate petal of the first membrane and under the remaining alternate petals so as to substantially interlock said first and second membranes together; and an arm extending outwardly from said second circular membrane into the flange portion of said first flexible membrane for mounting on said support member.

11. A flow pressure sensor as in claim 1 wherein said flexible electrically conductive strip further includes:

said first and second conductive strip portions being detachably connected to each other to form said closed switch;

said first and second conductive strip portions detaching from each other to form said open switch in said conductive path when a predetermined flow pressure is applied to said flexible membranes; and electrical extensions coupled to said first and second conductive strip portions to provide said indications of an open conductive path.

12. A flow pressure sensor as in claim 11 wherein;

said first detachable strip portion has an outer end extending from said flange portion on said first membrane inwardly to an inner end;

said inner end being folded to form a U-shaped opening projecting inwardly; and said second detachable strip portion being formed of first and second individual arms, each arm having a first end for slidable longitudinal insertion in said U-shaped opening of said first detachable portion to make electrical contact and a second end extending outwardly to said flange portion of said first membrane for providing said electrical extensions such that, when said first and second strip portions are slidably detached, said indication of an open circuit is provided.

13. A flow pressure sensor as in claim 12 further including:

a slot in one of said insulative membranes; and said outer end of said first detachable strip portion being inserted in said slot and bent backward to form a U-shape to attach said outer end to said insulative membrane.

14. A pressure sensor as in claim 4 wherein:

said opening in the first center portion of said first and second outer membranes is a substantially square opening;

a slot extending radially outwardly from at least two corners of said square opening to form at least two flexible petal portions; and a second center portion in said third inner layer of insulated membrane including a square flexible petal for substantially covering said square opening in said first and second membranes.

15. A flow pressure sensor as in claim 14 wherein:

said square flexible petal having an arm extending radially outwardly from each of at least two corners to substantially cover the superimposed corresponding at least two corner slots in said first and second membranes; and at least one of said arms extending outwardly to and being integrally formed with said flange portion of said third membrane.

16. A flow pressure sensor as in claim 14 wherein:

said square flexible petal is integrally formed with said flange portion along only one edge of said square flexible petal; and a slit is formed partially along said one edge to increase flexibility of said petal.

17. A flow pressure sensor as in claim 4 wherein:

said opening in the first center portion of said first and second outer membrane layers is formed of substantially centered first and second perpendicular slits extending outwardly toward said flange portion;

a second center portion in said third membrane including a flexible square portion with corners extending toward said flange portion and being of a size sufficient to substantially cover the perpendicular slits in said first and second membranes; and an arm extending outwardly from at least one corner of said square toward and being integrally formed with said flange portion of said third membrane.

18. A flow pressure sensor as in claim 17 wherein one of said arms extends outwardly from each of two corners of said square and are both integrally formed with said flange portion of said third membrane.

19. A flow pressure sensor as in claim 4 wherein:

said discontinuity in said first and second membranes includes a first center orifice having a first diameter and at least two slits spaced from each other and extending outwardly from said center orifice and forming at least two petal portions between said slits; and said third membrane has a second center orifice with a second diameter larger than said first diameter of said center orifice of the first and second membranes and circumscribing the outer ends of said at least two slits.

20. A flow pressure sensor as in claim 19 wherein four of said slits are equally spaced from each other and extend radially outwardly from center orifice to form four petals.

21. A flow pressure sensor as in claim 12 wherein said electrical extensions coupled to said second detachable strip portions arms extend outwardly beyond said flange portion of said first flexible membrane for receiving a connection to electrical leads.

22. A flow pressure sensor as in claim 12 wherein said electrical extensions coupled to said second detachable strip portion arms extend outwardly and terminate under said flange portion of said first flexible membrane for receiving a connection to electrical leads.

23. A flow pressure sensor as in claim 1 wherein said conductive strip includes:

said first and second conductive strip portions being detachably connected to each other such that when a predetermined pressure is applied to said membrane, said first and second strip portions detach and electrical continuity through said conductive strip portions is broken; and electrical extensions forming part of said electrically conductive strip such that, when said first and second strip portions are detached, an open switch indication is provided at said electrical extensions.

24. A flow pressure sensor as in claim 23 wherein:

said first detachable strip portion has an outer end extending from said flange portion inwardly and having an inner end;

said inner end being folded so as to form a U-shaped opening projecting inwardly; and said second detachable strip portion being formed of first and second parallel individual arms, each arm having a first end for slidable longitudinal engagement with said U-shaped opening of said first detachable portion to make electrical contact and a second end extending outwardly to said flange for providing said electrical extensions such that when said first and second strip portions are slidably detached, said indication is provided.

25. A flow pressure sensor as in claim 24 further including an insulated annular support member for mounting said flexible membranes in said central flow passageway.

26. A flow pressure sensor as in claim 25 wherein said insulated support member includes:

first and second outer layers of substantially rigid insulating material in superimposed relationship;

each first and second outer layer being in the form of an annular flange having an inner and an outer circumference, said inner circumference forming a center opening defining said central flow passageway;

a projection on each outer layer extending outwardly from the outer circumference of said annular flange;

a third center layer of substantially rigid insulating material in the form of said annular flange and in superimposed relationship with said first and second outer layers and having a greater thickness than said first and second layers;

a projection on said third center layer in superimposed mating relationship with each of said outer layer projections;

said at least first and second layers of flexible membrane and said juxtaposed conductive strip being mounted between the flange of one of said first and second outer layers and the flange of said third center layer of substantially rigid insulating material;

said outwardly extending second end of said first and second arms of said conductor strip being mounted between said third center layer and one of said first and second outer layers; and fastening means attaching the first, second, and third layers together in a sandwich fashion.

27. A flow pressure sensor as in claim 26 further including:

first and second adjacent cavities in said third center layer extended projection for receiving the second end of the respective first and second arms;

a third cavity extending inwardly from said outer circumference of said third center layer and intersecting both said first and second adjacent cavities to form a passageway; and externally accessible electrical conductors in said passageway and attached to said second end of said first and second arms for providing said indication of an open switch.

28. A flow pressure switch as in claim 27 further including:

epoxy placed in said cavities to seal said electrical conductors and said second ends of said first and second arms;

a metal plate on each outer side of said extended projections on each of the first and second outer layers; and at least one rivet extending from one metal plate on one side of said extended projection through the metal plate on the other side of said extended projection to rigidly maintain said first, second, and third insulating layers together.

29. A flow pressure sensor as in claim 28 further including:

a first glue strip extending around the inner periphery of the outer circumference of the first and second outer insulating layers; and a second glue strip extending around the inner periphery of the inner circumference of the first and second outer insulating layers such that when said first, second, and third insulating layers are sandwiched together, the third control layer is glued to first and second outer layers.

30. A differential pressure flow sensor for use in a very low pressure flow line and including:

an insulated support member sealed in said flow line and defining a central flow passageway;

two outer layers of insulative membrane separated by an inner membrane layer and mounted in superimposed coterminous relationship on said support member;

each outer membrane and said inner membrane having an annular flange portion mounted in said support member and a center portion for alignment with said flow passageway;

each center portion of said outer membranes having a substantially square opening;

a slot extending radially outwardly from each corner of said square opening to form two pair of opposed flexible petal portions surrounding said square opening;

a substantially square flexible center flap forming a portion of said inner membrane layer for overlapping and substantially covering said square opening in each of said outer membranes in a loosely fitting relationship;

an arm extending diametrically outwardly from each corner of said square center flap to overlap and substantially cover the corresponding superimposed corner slots in said outer membranes such that the amount of overlap of said center flap and related arms with respect to said square opening and related slots determines a bleed flow rate for said sensor;

two of said arms extending outwardly to and being integrally formed with said flange portion of said inner membrane;

a flexible strip of electrically conductive material interposed between one of said outer membrane layers and said inner membrane layer;

said electrically conductive strip including a normally closed switch portion that is opened when a predetermined flow pressure exceeding said bleed flow rate is applied to said overlapping membranes; and electrical contacts coupled to said electrically conductive strip to provide an indication when said switch is opened.

31. A differential pressure flow sensor for use in a very low pressure flow line and including:

an insulated support member sealed in said flow line and defining a central flow passageway;

two outer layers of insulative membrane separated by an inner membrane layer and mounted in superimposed coterminous relationship on said support member;

each outer membrane and said inner membrane having an annular flange portion mounted in said support member and a center portion for alignment with said flow passageway;

each center portion of said outer membranes having first and second perpendicular slits;

a flexible substantially square center flap on said inner membrane with corners extending toward said flange portion a sufficient distance to substantially cover the perpendicular slits in said outer membranes in a loosely fitting relationship;

an arm extending radially outwardly from each of two corners of said square center flap toward and being integrally formed with said inner membrane flange portion, the size of, said square center flap in combination with said perpendicular slits determining a fluid bleed flow rate for said sensor;

a flexible strip of electrically conductive material interposed between one of said outer membrane layers and said inner membrane layer;

said electrically conductive strip including a normally closed switch portion that is opened when a predetermined flow pressure exceeding said bleed flow rate is applied to said overlapping membranes; and electrical contacts coupled to said electrically conductive strip to provide an indication when said switch is opened.

32. A differential pressure flow sensor for use in a very low pressure flow line and including:

an insulated support member sealed in the flow line and defining a central flow passageway;

two outer layers of insulative membrane separated by an inner membrane layer and mounted in superimposed coterminous relationship on said support member;

each outer membrane and the inner membrane having a flange portion mounted in said support member and a center portion for alignment with the flow passageway;

each center portion of the outer membranes having an orifice of a first diameter;

four slits equally spaced from each other and extending radially outwardly from the center orifice to form four flexible petals;

an orifice forming center portion of the inner membrane layer having a second diameter larger than the first diameter orifice;

the second diameter orifice circumscribing the outer ends of the four slits in the outer membranes and providing a fluid bleed flow rate through the outer and inner membranes;

a flexible strip of electrically conductive material interposed between one of said outer membrane layers and the inner membrane layer;

the electrically conductive strip including a normally closed switch portion that is opened when a predetermined flow pressure exceeding the bleed flow rate is applied to the overlapping membranes; and electrical contacts coupled to the electrically conductive strip to provide an indication when the switch is opened.

33. A differential pressure flow sensor for use in very low pressure flow lines and including:

an insulated support member sealed in the flow line and defining a central flow passageway;

a first washer-shaped membrane having an outer circumference and an inner circumference and including a flange portion adjacent the outer circumference mounted in the support member;

at least four slits equally spaced 90° from each other and extending inwardly into the first membrane from the inner circumference to form four petals;

a second membrane being substantially circular in shape and being interwoven over two opposing petals on the first membrane and under the remaining two opposing petals on the first membrane to interlock the membranes together in a loosely fitting relationship with a fluid bleed flow rate through said membranes;

a flexible strip of electrically conductive material interposed between at least portions of the first and second membranes;

a normally closed switch portion forming a part of the electrically conductive strip, the switch being opened when a predetermined flow pressure exceeding said bleed flow rate is applied to the overlapping membranes; and electrical contacts coupled to the electrically conductive strip to provide an indication when the switch is opened.

34. A differential pressure flow sensor for use in a very low pressure flow line and including:

an insulated support member sealed in the flow line and defining a central flow passageway;

first and second layers of insulative membrane mounted in adjacent contacting relationship on the support structure;

a first washer-shaped membrane forming the first membrane and having an outer circumference and an inner circumference and having a flange portion including the outer circumference for mounting on the support member;

a plurality of sets of opposing slits extending inwardly into the first membrane from the inner circumference to form an even number of petals;

a second flexible membrane forming the second adjacent membrane and being substantially circular in shape and being interwoven over each alternate petal of the first membrane and under the remaining alternate petals so as to substantially interlock the first and second membranes together and providing a fluid bleed flow rate through said membranes;

an arm extending outwardly from the second circular membrane into the flange portion of the first flexible membrane, said arm being mounted on the support member;

a flexible strip of electrically conductive material interposed in contacting relationship between at least a portion of the first and second membrane layers and having first and second conductive strip portions;

first and second normally closed switch portions forming part of the electrically conductive strip portions and that are opened when a predetermined flow pressure exceeding the fluid bleed flow rate is applied to the adjacent membranes; and electrical contacts coupled to the electrically conductive strip portions to provide an indication when the switch portions are opened.

35. An insulated support member for holding a differential pressure flow sensor sealed in a flow line across a central flow passageway, the sensor including an electrically conductive strip of flexible material in a juxtaposed relationship to the at least first and second flexible membranes, said conductive strip having a first portion electrically mating with first and second conductive extensions, the support member including;

first and second outer layers of substantially rigid insulating material in a superimposed relationship;

each outer layer being in the form of an annular flange having an inner and an outer circumference, the inner circumference forming a center opening defining the central flow passageway;

a projection on each outer layer extending outwardly from the outer circumference of the annular flange and receiving the first and second conductive extensions of the conductive strip;

a third center layer of substantially rigid insulating material being in the form of an annular flange and being in superimposed relationship with the first and second outer layers and having a greater thickness than the first and second outer layers;

a projection on the third center layer in superimposed mating relationship with each of the outer layer projections;

the flow sensor, including the at least first and second flexible membranes and the juxtaposed conductive strip, being mounted across the central flow passageway between the flange of one of the first and second outer support layers and the flange of the third center layer; and fastening means attaching the first, second, and third layers together in a sandwiched fashion.

36. An insulated support member as in claim 35 further including:

first and second adjacent cavities in the third center layer extended projection for receiving the outer ends of both the first and second extensions of the conductive strip;

a third cavity extending inwardly from the outer circumference of the third center layer and intersecting both the first and second adjacent cavities to form a passageway; and the passageway receiving externally accessible electrical conductors for providing an indication of an open conductive strip.

37. An insulated support member as in claim 36 further including:

first and second adjacent recesses extending inwardly from the inner circumference of the third center layer in axial alignment with the first and second adjacent cavities for receiving the inner ends of the first and second extensions of the conductive strip; and epoxy in the first and second adjacent cavities and the first and second adjacent recesses for sealing the ends of the first and second conductive strip extensions therein.

38. A differential pressure flow sensor for use in a very low pressure flow line having a central flow passageway and including:

at least first and second layers of flexible membranes mounted across said central flow passageway, at least one of said layers having a discontinuity and providing a predetermined fluid bleed flow rate through said membranes;

an electrically conductive strip of flexible material in a juxtaposed contacting relationship with said layers of flexible membranes;

said electrical conductive strip having first and second conductive strip portions detachably connected to each other with detachable electrical contacts to form a normally closed switch for completing an electrical circuit;

said first and second conductive strip portion contacts detaching from each other to open said switch in said conductive path when a predetermined flow pressure exceeding the fluid bleed flow rate is applied to said flexible membranes;

said first and second conductive strip portion contacts configured so as to allow for their reattachment to reestablish said conductive path; and electrical contacts coupled to said electrically conductive strip to provide an indication when said switch is opened.

* * * * *